(12) United States Patent
Newcomb

(10) Patent No.: US 7,603,932 B2
(45) Date of Patent: Oct. 20, 2009

(54) METHOD AND APPARATUS FOR THE SEPARATION OF A FIRST STRUCTURE FROM A SECOND STRUCTURE AT A CONNECTING POINT

(75) Inventor: Thomas P. Newcomb, Defiance, OH (US)

(73) Assignee: GM Global Technology Operations, Inc., Detroit, MI (US)

( * ) Notice: Subject to any disclaimer, the term of this patent is extended or adjusted under 35 U.S.C. 154(b) by 151 days.

(21) Appl. No.: 11/460,727

(22) Filed: Jul. 28, 2006

(65) Prior Publication Data

US 2008/0022795 A1    Jan. 31, 2008

(51) Int. Cl.
*B26D 1/00* (2006.01)
*B26D 3/00* (2006.01)
*B26D 1/48* (2006.01)

(52) U.S. Cl. .......................................... 83/13; 83/200.1
(58) Field of Classification Search ................ 83/13, 83/200.1; 30/134, 226
See application file for complete search history.

(56) References Cited

U.S. PATENT DOCUMENTS

| 596,066 | A | 12/1897 | Helwig |
| 4,890,798 | A * | 1/1990 | Tagawa et al. .............. 241/266 |
| 5,044,568 | A * | 9/1991 | Shigemizu .................. 241/169 |
| 5,058,272 | A | 10/1991 | Steube |
| 6,752,054 | B2 * | 6/2004 | Knight .......................... 83/13 |
| 6,994,284 | B1 * | 2/2006 | Ramun ....................... 241/266 |
| 7,121,489 | B2 * | 10/2006 | Ramun ....................... 241/266 |
| 2005/0076513 | A1 | 4/2005 | Brailovskiy |

FOREIGN PATENT DOCUMENTS

DE    19632168 A1    7/1997

\* cited by examiner

*Primary Examiner*—Ghassem Alie
*Assistant Examiner*—Bharat C Patel
(74) *Attorney, Agent, or Firm*—Fraser Clemens Martin & Miller LLC; J. Douglas Miller

(57) ABSTRACT

A method and apparatus is disclosed for the separation of a first structure from a second structure at a connecting point thereof, wherein damage to the first structure is minimized.

6 Claims, 5 Drawing Sheets

METHOD AND APPARATUS FOR THE SEPARATION OF A FIRST STRUCTURE FROM A SECOND STRUCTURE AT A CONNECTING POINT

FIELD OF THE INVENTION

The invention relates to a disjoining apparatus and more particularly to a method and apparatus for the separation of a first structure, such as an engine block casting, at a connecting point to a second structure, such as a riser.

BACKGROUND OF THE INVENTION

In a typical sand casting process, a molten material is introduced into a casting cavity through a fluid passage called a runner system. The runner system typically includes one or more risers. Risers are reservoirs of liquid metal positioned adjacent features called gates. The gates are the points at which the molten metal enters the casting cavity. The presence of ample molten material in the reservoirs militates against the formation of cavities or voids in the casting due to shrinkage of the molten material during solidification thereof. However, when the cast object is removed from the mold, the runner system, including the risers and gates, remains attached to the casting. At some point in the foundry process the casting must be separated from the runner system. This process step is called de-gating.

Typically, at some time after the cast object has been removed from the expendable sand mold, the runner system is removed using one of the following methods: 1) apply an impact force to the riser, causing the gate connection to fracture; 2) pry the casting and riser apart using a mechanically powered wedge device positioned between the casting and riser, causing the gate connection to fracture; 2) melt the gate connection using an oxy-acetylene or plasma torch; 4) fracture the gate connections using a trim press equipped with tooling specific to the casing design; or 5) sever the gate connections using a band saw, circular saw, or abrasive wheel.

A band saw or large circular saw is typically used to remove the risers from aluminum cylinder block castings. These castings typically require a gate connection at multiple locations on the cylinder head mounting face. Two or more of these gate connections are often attached to a single riser feature. De-gating methods other than sawing are not feasible due to the risk of mechanical or thermal damage to the casting or limited accessibility of the connecting points.

Sawing is preferably done at or near room temperature, requiring a cooling period of the cast object. However, it is desirable to perform a heat treatment on the cast object as soon as possible after the casting process to take advantage of the residual heat in the cast object and to minimize casting inventory. Sawing is also adversely affected by the presence of sand in the cutting region. Therefore, removal of the risers typically does not occur until after the heat treatment process which also removes much of the sand from the cutting region.

The presence of risers during the heat treatment process increases the time and energy required for heating and cooling the casting. Also, the cast object may crack during quenching due to different cooling rates of the riser and the casting. A larger heating furnace is also needed due to the increased weight and volume of the cast object including the risers. Further, removal of sand from internal passages during heat treatment is inhibited by the presence of risers, adversely affecting quenching and internal casting cleanliness. Failure to adequately remove sand from a sawed region also adversely affects saw blade life.

It would be desirable to develop a method and apparatus for the separation of a first structure at a connecting point to a second structure, wherein damage to the first structure and costs of production are minimized.

SUMMARY OF THE INVENTION

Concordant and congruous with the present invention, a method and apparatus for the separation of a first structure at one or more connecting point to a second structure, wherein damage to the first structure and costs of production are minimized, has surprisingly been discovered.

In one embodiment, the disjoining apparatus comprises a driving member adapted to provide a force; a first disjoining arm having a working face disposed thereon, said first disjoining arm operatively coupled to said driving member; and a second disjoining arm having a working face thereon, said second disjoining arm operatively coupled to said driving member, wherein the force provided by said driving member causes said first disjoining arm to move the working face and said second disjoining arm to move the working face to cause the working faces to cooperate and disjoin a connecting point between a first structure and a second structure.

In another embodiment, the disjoining apparatus for disjoining a connecting point between a riser and a cast object comprises a driving member adapted to provide a force; a first disjoining arm having a working face disposed thereon; a second disjoining arm having a working face thereon cooperating with the working face of said first disjoining arm to disjoin a connecting point between the riser and the cast object; a first linkage having a first end pivotally connected to said first disjoining arm and a second end pivotally connected to said driving member; and a second linkage having a first end pivotally connected to said second disjoining arm and a second end pivotally connected to said driving member, wherein the force provided by said driving member causes pivotal movement of said first linkage and said second linkage and said first disjoining arm and said second disjoining arm to cause the working faces thereof to disjoin the connecting point between the riser and the cast object.

The invention also provides a method for the separation of a first structure joined at a connecting point to a second structure, comprising the steps of providing a first disjoining arm having a working face disposed thereon, a second disjoining arm having a working face disposed thereon, and a driving member coupled to the first disjoining arm and the second disjoining arm; positioning the connecting point between the working face of the first disjoining arm and the working face of the second disjoining arm; and providing a force with the driving member to cause the working face of the first disjoining arm and the working face of the second disjoining arm to disjoin the connecting point and separate the first structure from the second structure.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
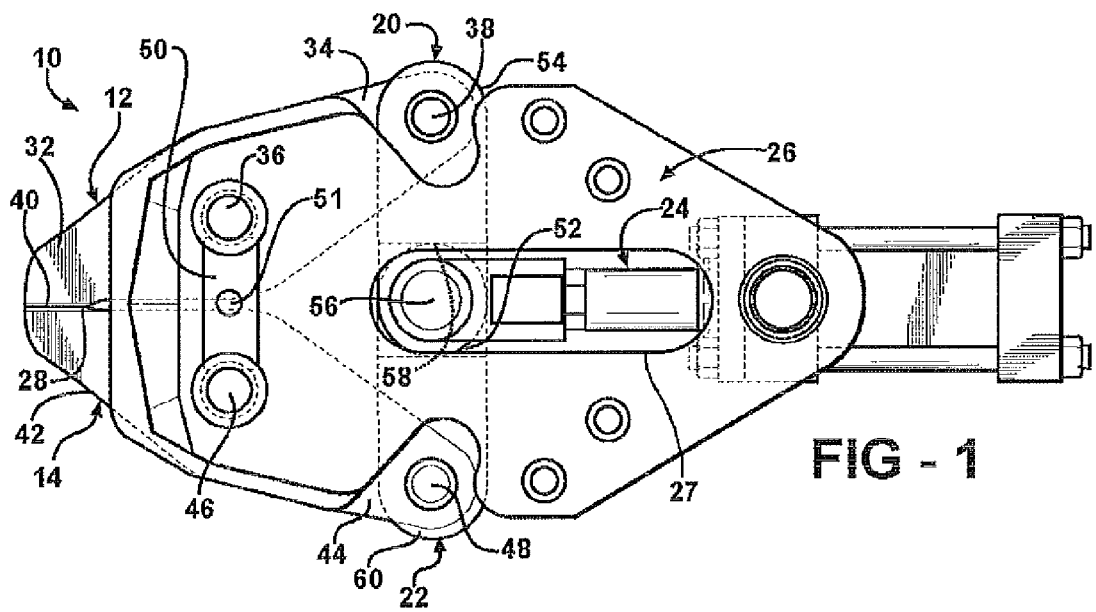
FIG. 1 is a top plan view of a disjoining apparatus according to an embodiment of the invention and illustrating the disjoining apparatus in a closed position.
Figure 2:
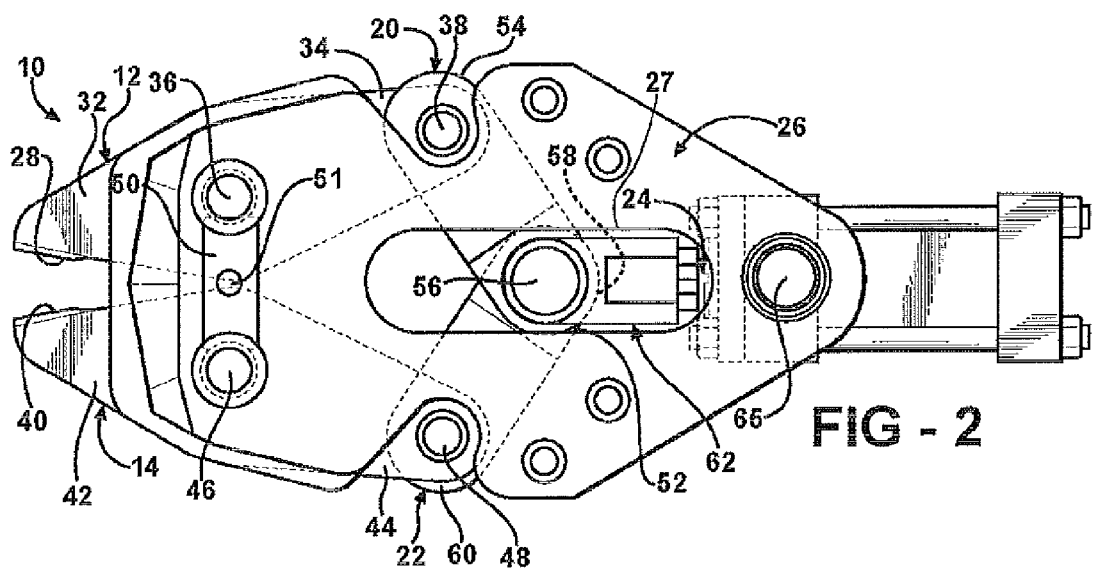
FIG. 2 is a top plan view of the disjoining apparatus of FIG. 1 illustrating the disjoining apparatus in an open position.

FIGS. 1 and 2 show a disjoining apparatus 10 including a first disjoining arm 12, a second disjoining arm 14, a first linkage 20, a second linkage 22, and a driving member 24. The first disjoining arm 12, the second disjoining arm 14, the first linkage 20, the second linkage 22, and the driving member 24 are coupled to and at least partially enclosed by a pair of plates 26.

Figure 6A:
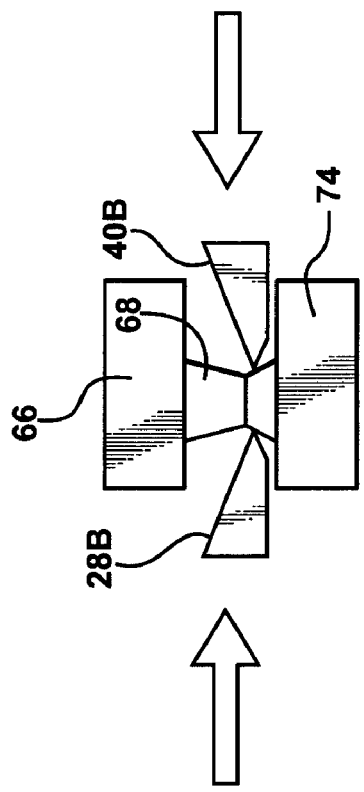
FIGS. 6A, 6B, 6C, and 6D are schematic elevational views of various working face configurations for use with the disjoining apparatus of FIG. 1.

The first disjoining arm 12 includes a first end 32 and a second end 34. A working face 28 is formed adjacent the first end 32. In the embodiment shown, the working face 28 is formed on the first disjoining arm 12 and has a substantially triangular cross-sectional shape, as shown in FIG. 6A. The working face 28 and the first disjoining arm 12 may be formed from any conventional material capable of withstanding elevated pressures and temperatures, such as temperature ranges used in casting processes, without substantially damaging the apparatus 10. It is understood that the working face 28 may be formed separately from the first disjoining arm 12 and attached thereto. An aperture (not shown) is formed intermediate the first end 32 and the second end 34 of the first disjoining arm 12. The aperture is adapted to receive a fastener 36 therein, as more clearly shown in FIG. 3. An aperture (not shown) is formed adjacent the second end 34 of the first disjoining arm 12, and is adapted to receive a fastener 38 therein. In the embodiment shown, the fasteners 36, 38 are pivot pins. It is understood that any conventional fastener may be used such as a bolt, for example. The fastener 36 pivotally couples the first disjoining arm 12 to the plates 26.

The second disjoining arm 14 includes a first end 42 and a second end 44. In the embodiment shown, the working face 40 is formed on the second disjoining arm 14 and has a substantially triangular cross-sectional shape, as shown in FIG. 6A. The working face 40 and the second disjoining arm 14 may be formed from any conventional material capable of withstanding elevated pressures and temperatures, such as temperature ranges used in casting processes, without substantially damaging the apparatus 10. It is understood that the working face 40 may be formed separately from the second disjoining arm 14 and attached thereto. An aperture 45 is formed intermediate the first end 42 and the second end 44 of the second disjoining arm 14, and is adapted to receive a fastener 46 therein. An aperture 47 is formed adjacent the second end 44 of the second disjoining arm 14, and is adapted to receive a fastener 48 therein. In the embodiment shown, the fasteners 46, 48 are pivot pins. It is understood that any conventional fastener may be used such as a bolt, for example. The fastener 46 pivotally couples the second disjoining arm 14 to the plates 26.

A retainer 50 is disposed between the pivot pins 36 and 46. The retainer 50 is fastened to the upper plate 26 with a fastener 51. The retainer 50 is adapted to cooperate with the pins 36, 46 to militate against the axial movement of the pivot pins 36 and 46 as the disjoining arms 12, 14 are repositioned.

The first linkage 20 includes a first end 52 and a second end 54. An aperture (not shown) is formed in the first end 52 and is adapted to receive a pivot pin 56 therein. An aperture (not shown) is formed in the second end 54. The aperture is adapted to receive the fastener 38 to pivotally couple the second end 54 of the first linkage 20 to the first disjoining arm 12. It is understood that other conventional means for pivotally coupling members may be used. It is further understood that the first linkage 20 may be positioned above, below, or both above and below the disjoining arm 12, as desired.

The second linkage 22 includes a first end 58 and a second end 60. An aperture (not shown) is formed in the first end 58 and is adapted to receive the pivot pin 56 therein. An aperture 61 is formed in the second end 60. The aperture 61 is adapted to receive the fastener 48 to pivotally couple the second end 60 of the second linkage 22 to the second disjoining arm 14. It is understood that other conventional means for pivotally coupling members may be used. It is further understood that the second linkage 22 may be positioned above, below, or both above and below the disjoining arm 14, as desired.

The actuator 64 includes a driving member 24 and an actuator arm 62. In the embodiment shown, the actuator 64 is pivotally mounted to the plates 26 of the disjoining apparatus 10 by trunnions 65. In the embodiment shown, the actuator 64 is a hydraulic cylinder, although other conventional driving members such as an electric device and a pneumatic device, for example, can be used, as desired. An aperture 63 is formed at a distal end of the actuator arm 62. The aperture 63 is adapted to receive the pivot pin 56 therein and pivotally couple the actuator arm 62 to the first ends 52, 58 of the linkage members 20, 22. Apertures 67 are formed in the plates 26 adjacent the actuator 64. The apertures 67 are adapted to receive the trunnions 65 and pivotally couple the actuator 64 to the disjoining apparatus 10. The trunnions 65 are cylindrical pins but may be any other functionally similar structure such as gudgeons, for example. The actuator 64 is in communication with a power source (not shown) and a controller (not shown).

Figure 3:
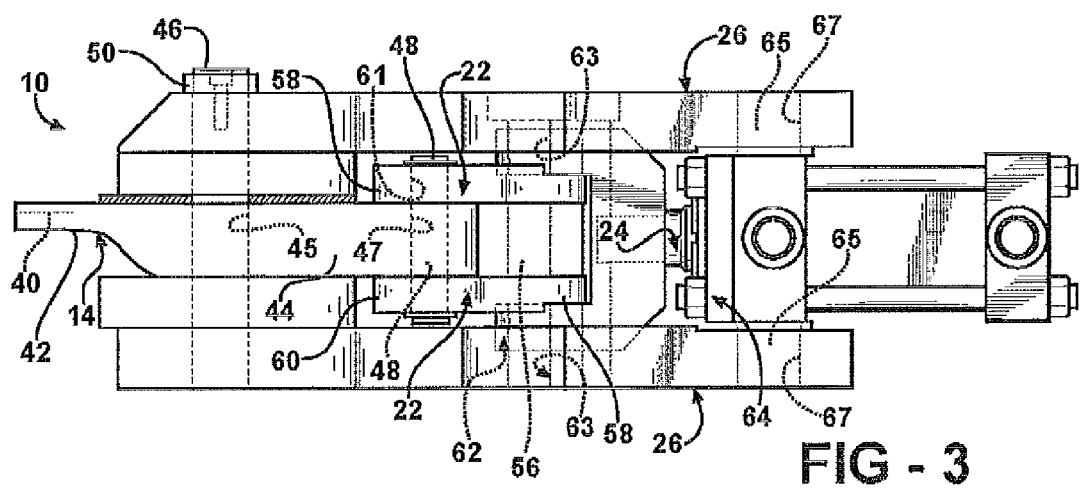
FIG. 3 is a side elevational view of the disjoining apparatus of FIGS. 1 and 2.
Figure 6B:
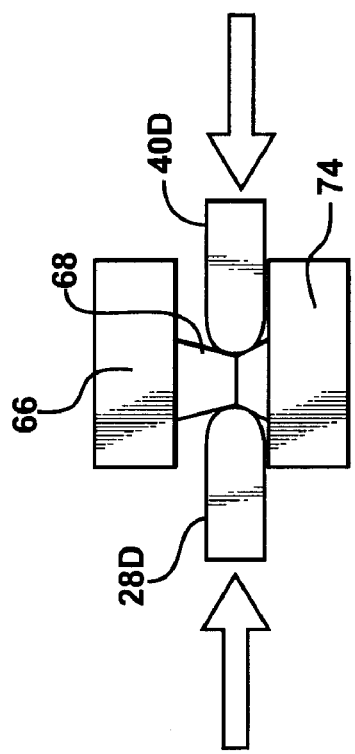
Figure 6C:
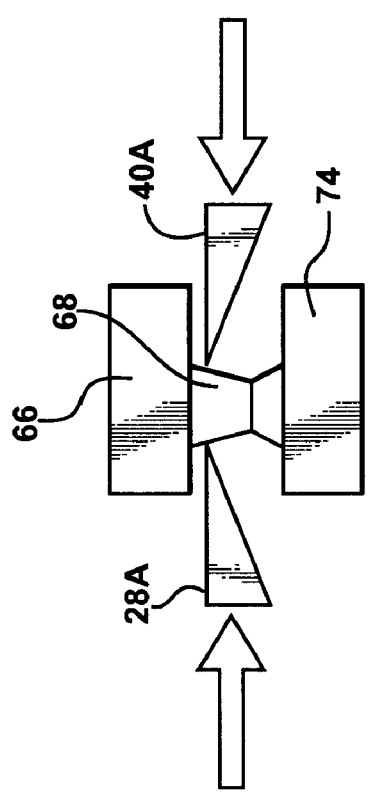
Figure 6D:
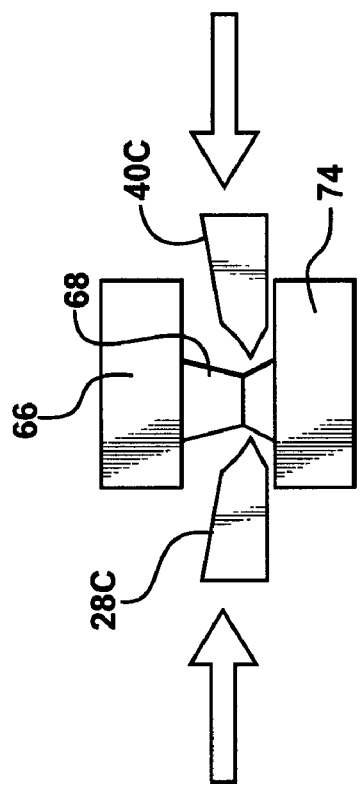

It is understood that the working faces 28, 40 of the disjoining arms 12, 14 may have any configurations, as desired. As shown in FIGS. 3 and 6A, the disjoining arms 12, 14 and the working faces 28, 40 thereof lie in substantially the same plane. FIGS. 6A, 6B, 6C, and 6D are illustrative of alternate configurations of the working faces 28, 40 as the working faces engage with a first structure 66, a connecting point 68, and a second structure 74. FIG. 6A shows working faces 28A, 40A with simple wedge shaped working faces, best suited for minimizing the residual material of the connecting point 68 left on the first structure 66. FIG. 6B shows working faces 28B, 40B that form a bevel, better suited for minimizing damage to the working faces 28B, 40B. FIG. 6C show working faces 28C, 40C that form a double bevel, better suited to impart movement of structure 66 away from structure 74 following fracture of connection point 68. FIG. 6D shows working faces 28D, 40D forming a substantially rounded edge thereon, better suited for use on high ductility materials. It is understood that the durability of the working faces 28, 40 may be enhanced by flattening or rounding the sharp, leading edge of the face to avoid premature chipping or cracking of the working face 28, 40.

Figure 4:
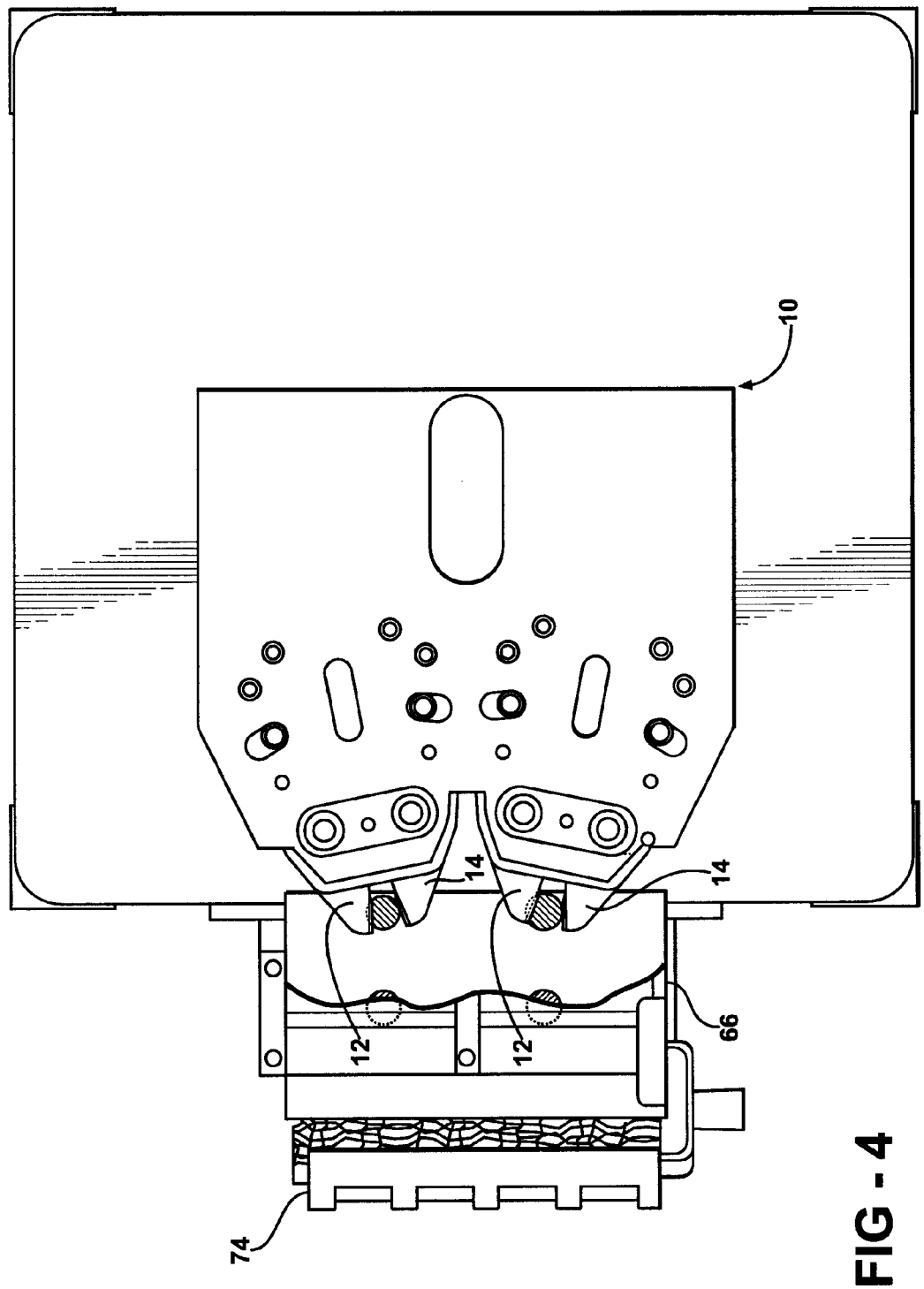
FIG. 4 is a top plan view of a duplex disjoining machine incorporating two of the disjoining apparatus of FIG. 1, wherein the duplex machine is positioned adjacent a cast object prior to a disjoining operation.

As shown in FIG. 4, the disjoining apparatus 10 may be used in cooperation with an additional disjoining apparatus 10, as desired. It is understood that if more than one disjoining apparatus 10 is used, each disjoining apparatus 10 may be operated simultaneously independently of the other to insure that the cutting forces produced during operation remain internal to the individual article or connection to be disjoined.

In use, the disjoining apparatus 10 is disposed in the open position, as shown in FIG. 2. To open the disjoining apparatus 10, the actuator 64 causes the actuator arm 62 to move axially toward the actuator 64, and away from the connecting point 68 (not shown in FIG. 2). As shown in FIG. 2, when the disjoining apparatus 10 is in the fully open position the pivot pin 56 is positioned adjacent the actuator 64. As the driving member 24 is moved axially toward the actuator 64, the first linkage 20 rotates about the pivot pin 38 and the pivot pin 56. Simultaneously, the second linkage 22 rotates about the pivot pin 48 and the pivot pin 56. As the driving member 24 causes the first linkage 20 and the second linkage 22 to respectively rotate about the pivot pins 38, 48, the first disjoining arm 12 and the second disjoining arm 14 are caused to rotate about the pivot pins 36, 46 and the pivot pins 38, 48. Since the second end 34 of the first disjoining arm 12 is pivotally coupled to the second end 54 of the first linkage 20 with the pivot pin 38, the second end 34 of the first disjoining arm 12 is caused to move toward the driving member 24. Simultaneously, since the second end 44 of the second disjoining arm 14 is coupled to the second end 60 of the second linkage 22 with the pivot pin 48, the second end 44 is caused to move toward the driving member 24.

Figure 5:
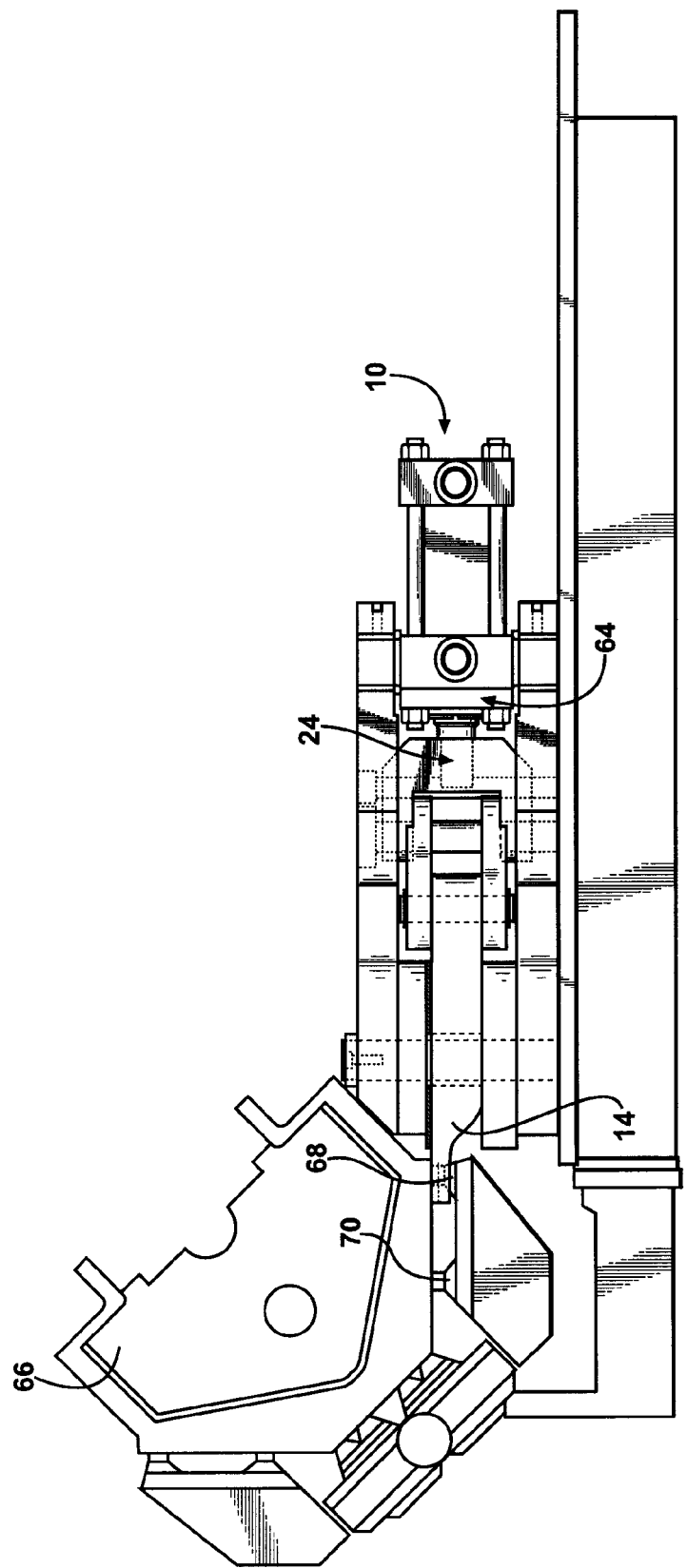
FIG. 5 is a side elevational view of the disjoining machine and the cast object shown in FIG. 4.

Once the disjoining apparatus 10 is in the open position, a first structure 66 connected to a second structure 74 at a connecting point 68 is positioned adjacent the disjoining apparatus 10, as shown in FIG. 5. The connected structures 66, 68, 74 may be positioned using a lifting bail, crane, or other device, as desired. The first structure 66 may be any object such as a cast object (i.e. an engine block), for example. In the embodiment shown, the second structure 74 is a riser. It is understood that the second structure 74 connected to the first structure 66 may be any article or remnant to be removed, as desired. It is also understood that the first structure 66 and the second structure 74 may be formed from any metal or non-metal, as desired. The connecting point 68 is then positioned between the working faces 28, 40 of the disjoining apparatus 10.

To remove the second structure 74 from the first structure 66, the connecting point 68 is disjoined by the disjoining apparatus 10. To disjoin the connecting point 68 the disjoining apparatus 10 is moved to a closed position, as shown in FIG. 1. To close the disjoining apparatus 10, the actuator 64 is caused to move the actuator arm 62 axially toward the second structure 74 in a direction away from the actuator 64. As the actuator arm 62 is caused to move, the first end 58 of the first linkage 20 and the first end 52 of the second linkage 22 rotate about the pivot pin 56 until each of the linkages 20, 22 are positioned substantially perpendicular to the driving member 24. As the first linkage 20 and the second linkage 22 rotate about the pivot pin 56, the second end 54 of the first linkage 20 rotates about the pivot pin 38 and the second end 60 of the second linkage 22 rotates about the pivot pin 48. Due to the rotation of the linkages 20, 22, the second end 34 of the first disjoining arm 12 is caused to rotate about the pivot pin 36 and the second end 44 of the second disjoining arm 14 is caused to rotate about the pivot pin 48. Thus, the first disjoining arm 12 rotates about the pivot pin 36 and the second disjoining arm 14 rotates about the pivot pin 46. The working faces 28, 40 are caused to move toward one another and disjoin the connecting point 68.

As the disjoining apparatus 10 closes, if the force imparted by one working face 28, 40 is unequal to the force provided by the other working face 28, 40, the actuator 64 will selectively pivot about the trunnions 65 to equilibrate the forces. By equilibrating the respective forces imparted by the working faces 28, 40, the net lateral stress imparted on the first structure 66 is minimized, militating against damage to structures 66, 74. The unequal force may be caused by one working face being dull and the other working face being sharp or due to a softer material on one side of the connecting point, for example. It is understood that the forces may be equilibrated by mounting individual disjoining apparatuses 10 in a manner that provides a degree of lateral compliance of each apparatus 10 relative to its supporting structure.

By utilizing a disjoining apparatus 10 with a first disjoining arm 12 having a working face 28 and second disjoining arm 14 having a working face 40, damage to the first structure 66 is minimized. As the disjoining arms 12, 14 penetrate the connecting point 68, the wedge-like shape of the working faces 28, 40 impart tensile stress upon the connecting point material residing between the working faces 28, 40. Under typical conditions, the tension causes the connecting point 68 to fail prior to the working faces 28, 40 fully penetrating the connecting point 68. The failure of connecting point 68 under tension, followed by movement of structure 66 away from structure 74 as the working faces 28, 40 continue to the closed position may cause collateral connecting points(s) 70 to also fail. The collateral connecting points 70 are the connections between the first structure 66 and the second structure 74 in the substantially same plane as the connecting points 68 that are not engaged by a disjoining apparatus 10 during a disjoining operation. If the connecting point 68 does not fracture under tension, the disjoining arms 12, 14 continue toward the closed position to completely disjoin the first structure 66 from the second structure 74 by means of plastic deformation of connection point 68.

Figure 7:
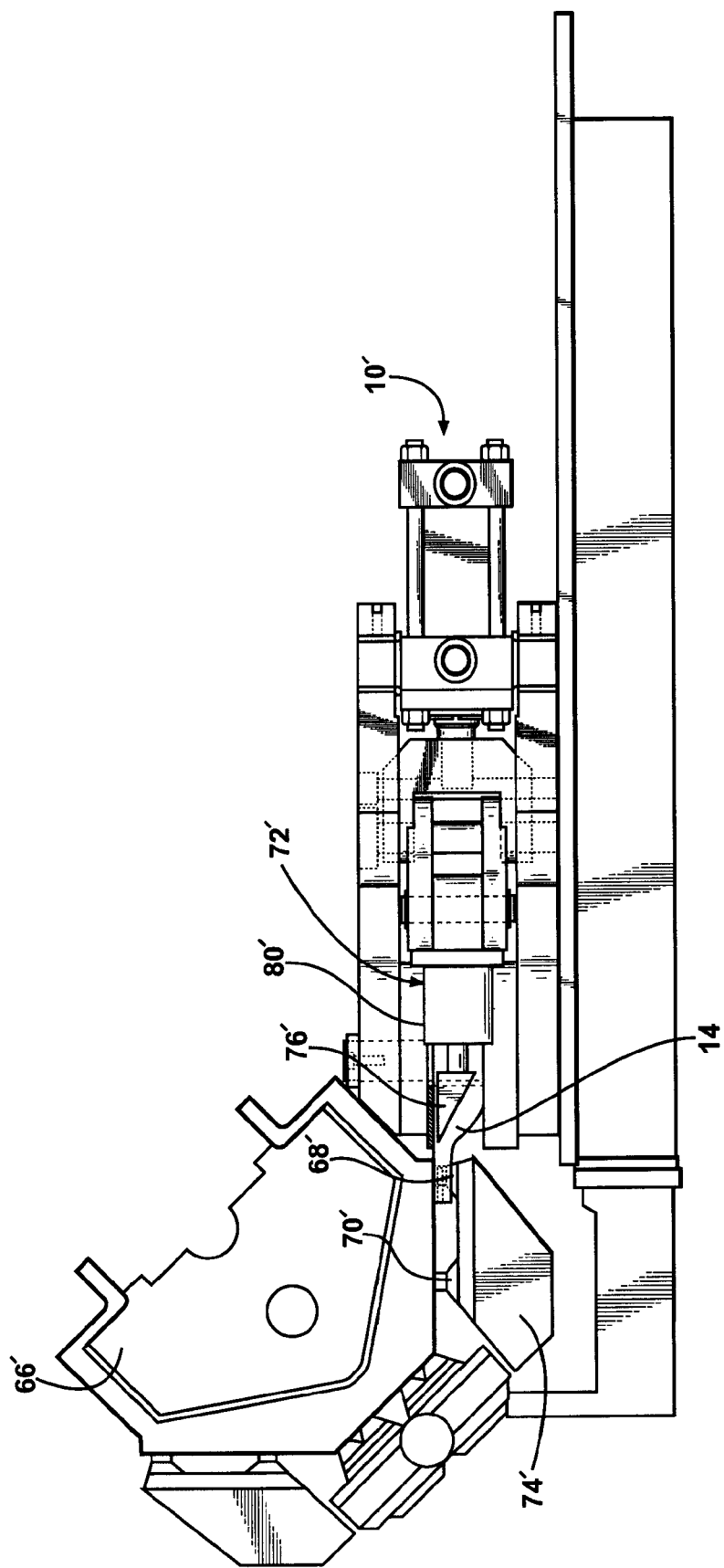
FIG. 7 is a side elevational view of the disjoining apparatus and the cast object shown in FIG. 4, including an auxiliary apparatus to further separate the disjoined structures.

FIG. 7 shows a disjoining apparatus 10' according to another embodiment of the invention. The embodiment of FIG. 7 is similar to the disjoining apparatus 10 of FIG. 1, except as described below. Similar to the structure of FIG. 1, FIG. 7 includes the same reference numerals accompanied by a prime (') to denote similar structure.

FIG. 7 illustrates the disjoining apparatus 10' further including a second actuator 72'. The second actuator 72' includes a driving member 80', and a wedge 76'. In the embodiment shown, the second actuator 72' is mounted to the disjoining apparatus 10' adjacent to the disjoining arm 14'. It is understood that the second actuator 72' may be mounted anywhere on or between the plates 26' of the disjoining apparatus 10', as desired. In the embodiment shown, the actuator 72' is a hydraulic cylinder, although other conventional driving members such as an electric device and a pneumatic device, for example, can be used, as desired. The second actuator 72' is in communication with a power source (not shown) and a controller (not shown). The wedge 76' is disposed on a distal end of the driving member 80'. In the embodiment shown, the wedge 74' has a substantially triangular cross-sectional shape. It is understood that the wedge 74' may have any other wedge shape, as desired.

In use, the second actuator 72' is utilized if the disjoining apparatus 10' disjoins connecting point 68' but does not separate the first structure 66' from the second structure 74' sufficiently to cause fracture of the collateral connection point 70'. Once the disjoining apparatus 10' has disjoined the connecting point 68' and is in a substantially closed position with disjoining arms 12, 14 residing between the disjoined portions of the connection point 68', the second actuator 72' is caused to move the actuator arm 80' and wedge 76' axially toward the structure 74' in a direction away from the second actuator 72'. The actuator arm 80' continues to extend after the wedge 76' contacts an upper surface of structure 74' The force exerted by the secondary actuator 72' and wedge 76' on the structure 74" causes a downward movement of structure 74', imparting a bending moment and tensile stress in collateral connection 70' sufficient to cause fracture of said connection. As shown, the wedge 74' is oriented such that it contacts the second structure 74' but does not contact the first structure 66' during activation of the second actuator 72'. However, it is understood that wedge 74' may contact both of the structures 66' and 74' simultaneously, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A disjoining apparatus comprising:
   a driving member adapted to provide a force;
   a first disjoining arm having a first end and a second end, a working face disposed thereon at the first end of the first disjoining arm, a first aperture formed in the first disjoining arm intermediate the first end and the second end, a second aperture formed in the first disjoining arm adjacent the second end;
   a second disjoining arm having a first end and a second end, a working face disposed thereon at the first end of the second disjoining arm, a first aperture formed in the second disjoining arm intermediate the first end and the second end, a second aperture formed in the second disjoining arm adjacent the second end;
   a first linkage and a second linkage, said first linkage having a first end pivotally coupled to said driving member and a second end having an aperture formed therein, the second end of the first linkage pivotally connected to said first disjoining arm with one of a first pair of pivot pins, the one of the first pair of pivot pins cooperating with the aperture of the first linkage and the second aperture of the first disjoining arm, and said second linkage having a first end pivotally coupled to said driving member and a second end having an aperture formed therein, the second end of the second linkage pivotally connected to said second disjoining arm with an other of the first pair of pivot pins, the other of the first pair of pivot pins cooperating with the aperture of the second linkage and the second aperture of the second disjoining arm;
   a pair of plates between which the first disjoining arm, the second disjoining arm, the first linkage, the second linkage, and the driving member are at least partially disposed, one of a second pair of pivot pins cooperating with apertures formed in the pair of plates and the first aperture of the first disjoining arm, wherein said first disjoining arm is operatively coupled to said driving member, and an other of the second pair of pivot pins cooperating with apertures formed in the pair of plates and the first aperture of the second disjoining arm, wherein said second disjoining arm is operatively coupled to said driving member; and
   a retainer coupled to an outer surface of one of the pair of plates with a fastener, the retainer cooperating with each of the second pair of pivot pins to militate against an axial movement of each of the second pair of pivot pins as the first and second disjoining arms are repositioned;
   wherein said driving member is pivotally coupled to the pair of plates with at least a trunnion and adapted to pivot about the trunnion to equilibrate the force provided by said driving member to the working faces, wherein each of the pair of plates has a slot formed therein extending between the retainer and the trunnion, the slot providing clearance for pivotal movement of the said first linkage and said second linkage caused by said driving member, wherein the force provided by said driving member causes the pivotal movement of said first linkage and said second linkage and said first disjoining arm and said second disjoining arm to cause the working faces thereof to cooperate and disjoin a connecting point between a first structure and a second structure.

2. The disjoining apparatus of claim 1, wherein the working faces of said first disjoining arm and said second disjoining arm have a shape selected from the group of triangular, rounded, beveled, and double beveled.

3. The disjoining apparatus of claim 1, wherein said driving member is powered by one of a hydraulic power source, an electric power source, and a pneumatic power source.

4. The disjoining apparatus of claim 1, wherein the working face of said first disjoining arm is integrally formed with said first disjoining arm.

5. The disjoining apparatus of claim 1, wherein the connecting point is disposed between a cast object and a riser.

6. The disjoining apparatus of claim 1, wherein the disjoining of the connecting point causes a mechanical failure of collateral connecting points not engaged by the disjoining apparatus.

* * * * *